Figure 1:
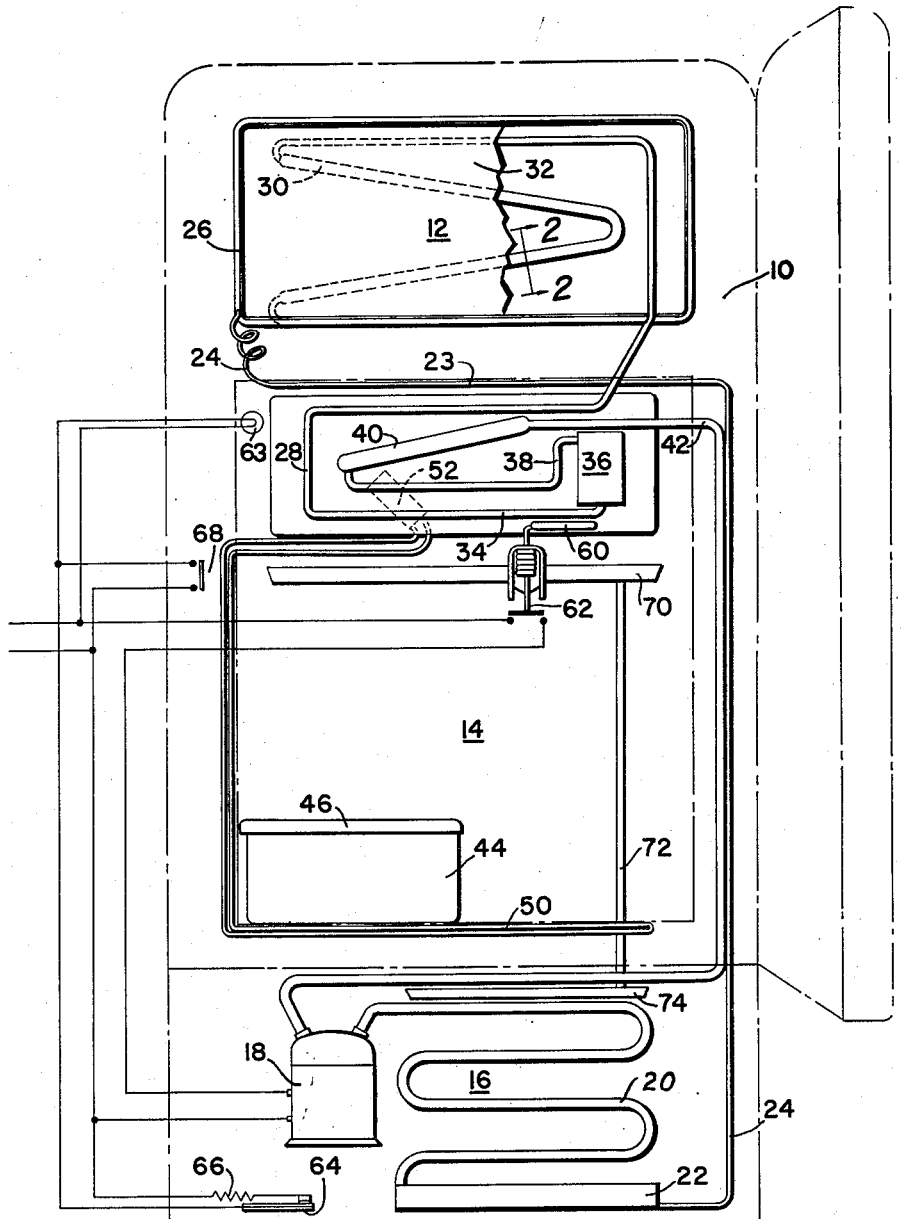

March 16, 1954  J. W. JACOBS ET AL  2,672,023
TWO-TEMPERATURE REFRIGERATING APPARATUS
Filed Feb. 23, 1952

INVENTOR.
James W. Jacobs, Clifford H. Wurtz
and John H. Heidorn.
BY
*Willits, Hardman & Fehr.*
*Their Attorneys.*

Patented Mar. 16, 1954

2,672,023

UNITED STATES PATENT OFFICE 2,672,023

TWO-TEMPERATURE REFRIGERATING APPARATUS

James W. Jacobs, Dayton, Clifford H. Wurtz, Oakwood, and John H. Heidorn, Dayton, Ohio, assignors to General Motors Corporation, Dayton, Ohio, a corporation of Delaware Application February 23, 1952, Serial No. 272,962

10 Claims. (Cl. 62—4)

1

This invention relates to refrigerating apparatus and more particularly to a simplified arrangement for automatically supplying refrigeration to a relatively low temperature frozen food compartment and a relatively high temperature food storage compartment in such a manner that automatic defrosting is accomplished.

Modern housewives buy appreciable quantities of frozen foods with the result that it is becoming increasingly important to provide household refrigerators having a relatively low temperature frozen food compartment in addition to the usual food storage compartment which must still be maintained at temperatures above freezing so as to avoid freezing beverages, fresh vegetables and other foods stored therein. The evaporator placed in a frozen food storage compartment collects very little frost in comparison to an evaporator in a conventional food storage compartment and therefore there is comparatively little, if any, need for defrosting the evaporator for the frozen food compartment. Furthermore, the evaporator in the conventional food storage compartment may be allowed to warm up to defrosting temperatures while the temperature therein remains within the desired range whereas the evaporator in the frozen food compartment normally cannot be defrosted without thawing some of the frozen foods. This then complicates the problem of defrosting.

It is desirable practice to provide a first evaporator for refrigerating the frozen food compartment and a second but relatively high temperature evaporator for refrigerating the main food storage compartment and to connect the two evaporators in series refrigerant flow relationship. Since it is necessary to frequently defrost that portion of the evaporator which is located in the main food storage compartment but it is highly undesirable to defrost the evaporator in the freezer compartment, this series flow of refrigerant through the two evaporators further complicates the defrosting problem.

Various arrangements have been devised in the past for applying outside heat to the one evaporator for defrosting the same without defrosting the other evaporator, but these arrangements have involved expensive constructions not only because of initial cost but also because of the fact that they have needlessly added heat to the evaporator in the main food storage compartment with the result that the refrigerator is required to operate over a longer period of time in order to remove the added heat.

It is an object of this invention to so construct

2 and arrange a pair of evaporators so that a first evaporator which cools the frozen food compartment will at all times maintain the necessary freezing temperatures within the freezer compartment even during that period when a second evaporator connected in series with the freezer compartment evaporator is being defrosted.

Another object of this invention is to provide a two temperature cabinet in which the evaporator which supplies refrigerant to the relatively high temperature compartment will defrost itself during each off cycle.

More particularly it is another object of this invention to provide an arrangement in which the defrosting evaporator is purged of liquid refrigerant within a short time after the compressor stops so as to stop all refrigeration thereof and so as to reduce the amount of material which needs to be warmed to refrosting temperature.

Another object of this invention is to provide a refrigeration system which primarily responds to refrigeration requirements in the main food storage compartment but in which means are provided for artificially inducing operation of the compressor when the ambient temperature is such that little or no refrigeration is required in the main food storage compartment.

Further objects and advantages of the present invention will be apparent from the following description, reference being had to the accompanying drawings, wherein a preferred form of the present invention is clearly shown.

Figure 2:

In the drawing:

Fig. 1 is a schematic view showing the refrigerant and electrical circuits used in a refrigerator embodying the invention; and Fig. 2 is a vertical sectional view taken on line 2—2 of Fig. 1 for the purpose of showing the shape of the disengaging tube.

Referring now to the drawing wherein a preferred improvement of the invention has been shown, reference numeral 10 generally designates a conventional insulated refrigerator cabinet having a frozen food compartment 12 disposed in the upper part of the cabinet, a main food storage compartment 14 disposed below the freezer compartment 12 and a refrigerant liquefying compartment 16 arranged in the bottom portion of the cabinet. The cabinet 10 is intended to designate a conventional cabinet of the general type disclosed in co-pending application Serial Number 223,590, filed April 28, 1951. The freezer compartment 12 is adapted to be maintained at all times at temperatures low enough to properly preserve frozen foods for longer periods of time.

Thus the temperature therein is preferably maintained somewhere between −10° F. and 10° F. The main food storage compartment 14 is preferably maintained at temperatures above freezing but low enough to properly refrigerate milk and other perishable unfrozen foods. It has been found that temperatures in the neighborhood of 37° to 40° F. are most satisfactory for this purpose.

The refrigerating system used for maintaining the compartments 12 and 14 within the desired temperature ranges employs a conventional motor compressor unit 18 which is adapted to be mounted in the compartment 16 and which discharges compressed refrigerant into a condenser 20, which is also located in the compartment 16. The condensed refrigerant collects in a receiver 22 from whence liquid refrigerant flows through a conventional capillary tube type of restrictor 24 which leads from the receiver 22 all the way up the freezer compartment evaporator section 26. It will be noted that a portion of the restrictor 24 is arranged in thermal exchange with the ceiling of the food storage compartment 16 as indicated at 23 for a purpose to be explained more fully hereinafter.

The evaporator section 26 is arranged in thermal exchange relationship with the outer wall of the freezer compartment 12 in accordance with well known practice. The amount of liquid refrigerant supplied to the evaporator 26 is normally in excess of that required for maintaining the freezer compartment 12 at the desired low temperature with the result that liquid refrigerant spills over from the evaporator section 26 into the plate type evaporator section 28 which is located in the main food storage compartment 14.

In order to reduce the tendency for the refrigerant vapor formed in the evaporator section 26 from percolating or shoving the liquid refrigerant into the evaporator section 28, a disengaging tube 30 has been provided as shown. This tube is preferably attached to the rear wall 32 of the frozen food compartment liner and is preferably made in the form of a flattened V-shaped tube having a cross section as shown in Fig. 2. By virtue of this arrangement, the vaporized refrigerant leaving the evaporator section 26 will tend to travel upwardly along the upper portion of the flattened tube section 30 and the liquid refrigerant will drain downwardly along the lower portion of the tube towards the evaporator section 26.

The plate is of such size as to provide adequate refrigeration for the food compartment in a 110 degree room. To limit the refrigerating effect of the plate under some conditions, there is provided a vertical liquid refrigerant trapping accumulator 36 between the refrigerant passage 34 which cools the peripheral areas of the plate and the passage 38 which refrigerates the central area of the plate so that liquid refrigerant will be stored in the accumulator 36 during the operating period to limit the amount of refrigerant passage which will be flooded.

The evaporator section 28 is in effect a sheet metal plate having refrigerant passages and chambers provided therein as indicated in Fig. 1 of the drawing. The liquid refrigerant spilling over from the evaporator section 26 first flows through a passage 34 which leads into the very bottom portion of a relatively large chamber 36. If the amount of liquid refrigerant supplied to the evaporator section 28 is more than enough to fill the passage 34 and the accumulator 36, the excess flows through the passage section 38 into the lower end of a second accumulator 40 which is arranged as shown. The upper end of the accumulator 40 is connected to the suction line 42 which returns the vaporized refrigerant to the inlet of the motor compressor unit 18. The arrangement of the inlets and outlets of the accumulators 36 and 40 is such that when the compressor stops, the build-up of gas pressure in the evaporator section 28 will force the liquid refrigerant out of the accumulators 40 and 36 and passages 38 and 34 back into the evaporator section 26.

At the bottom of the food compartment 14 there is provided a ventilated vegetable drawer or bin 44 which has a loosely fitting cover 46. To keep this vegetable bin properly refrigerated there is provided a secondary system as shown. This secondary refrigeration system includes an evaporator coil section 50 arranged in thermal exchange relationship with the floor of the food storage compartment 14 and a condenser 52 arranged in thermal exchange relationship with the evaporator section 28. This secondary system serves the dual purpose of picking up heat from beneath the food storage compartment 14 and transferring it directly to the evaporator 28 without passing it through the food and air in the compartment 14 and also serves the useful purpose of applying heat to the evaporator section 28 so as to facilitate defrosting of the evaporator section 28.

Previously it had been considered necessary to apply electrical heat or the equivalent to the one evaporator section for defrosting purposes whereas it has been found that with the arrangement shown herein it is possible to defrost during each off cycle without adversely affecting the temperature in either of the compartments 12 and 14.

By properly proportioning and designing the evaporator sections 26 and 28 with respect to one another and with respect to their respective heat loads, it is possible to connect the two evaporators in series and to operate them at substantially the same pressure and still maintain the desired temperature differential between the food in the frozen food compartment 12 and the food in the main food storage compartment 14. It is also possible to cycle the compressor so as to defrost the evaporator section 28 during the off portion of each cycle without adversely affecting temperatures in the freezer compartment 12.

A thermostat 60 is located at the lower right-hand corner of the plate type evaporator section 28 and serves to operate the motor control switch 62, which is of the type which closes the circuit to the compressor motor when the temperature at the bulb 60 reaches a predetermined high temperature such as 36° F. and remains closed until the temperature at the bulb 60 reaches a lower temperature such as −2° F. It is important to note that the bulb 60 is attached directly to the evaporator 28 so that it responds to evaporator temperatures rather than the temperature of the air in the food storage compartment as it has been found that the temperature of the air in the food storage compartment may be maintained substantially between 37° and 40° at all times even though the temperature at the bulb 60 fluctuates over a wide range such as 2° to 36°. The temperature values given herein are primarily for purposes of illustration and may be varied to suit different requirements.

The plate type evaporator 28 is preferably spaced about an inch from the rear wall of the food storage compartment 14 directly above a condensate collecting trough 70 which is attached to the rear wall of the compartment. For purposes of illustration there is shown a drain pipe 72 for conveying the condensate into a shallow pan 74 located in the compartment 16 whereas the drain pipe could be omitted and the water be allowed to run down along the rear wall of the food compartment from whence it would enter a drain in the bottom wall of the compartment and then empty into the pan 74. The heat from the compressor and condenser helps to evaporate the condensate in the pan 74. In the average home a refrigerator of this type is mounted in the kitchen where the room temperature normally is 70° or higher and under these conditions the above discussed refrigeration system will maintain the proper temperature differential between the freezer compartment and the food storage compartment 14 without difficulty. Some users however may place the evaporator on a back porch or in some other location where the temperature surrounding the refrigerator box may be low enough not to require much or any refrigeration in the compartment 14, but at temperatures too high for properly preserving the frozen foods in the compartment 12. Thus, if the outdoor temperatures are in the neighborhood of 30° F. it is obvious that this temperature is lower than the normal 37° to 40° temperature which the system is designed to maintain in the food storage compartment 14 with the result that even if the door to the refrigerator were left open the compressor would never need to operate insofar as the compartment 14 is concerned. At such temperatures the food compartment 14 would at times become too cold and for this reason it is necessary to actually add heat therein to prevent the food from freezing.

In order to compensate for abnormal conditions of this type an arrangement has been provided whereby the refrigerator light 63 will be turned on so as to artifically load the system so as to induce operation of the compressor at sufficient intervals to supply the necessary amount of refrigeration to keep the evaporator section 26 at a cold enough temperature to preserve the frozen foods in the compartment 12. Once the compressor starts operating it will normally continue to operate until the demand for refrigeration in the compartment 12 has been satisfied because it is not until the evaporator section 26 has been satisfied that enough refrigerant spills over into the evaporator section 28 to satisfy this latter section and eventually shut off the compressor.

A thermostat 64, which is preferably located in the compressor compartment 16 is adapted to close the circuit to the light bulb 63 when the temperature in the compartment 16 falls below a predetermined value such as 60°.

A heating element 66 is arranged in series with the light 63 and the thermostatically operated switch 64 and serves to heat the air surrounding the thermostat 64 so as to short cycle the operation of the light 63 and thereby prevent continuous operation of the light 63.

The construction and arrangement of the thermostat 64 and heater 66 is such that the thermostat will normally close the circuit to the light 63 approximately 16% of the time at 54° F. but it closes the circuit an increasing per cent of the time as the environment temperature falls below 54°. The lamp 63 preferably has a wattage rating selected to provide just the correct amount of heat to the food compartment 16 to maintain the temperature within the food compartment 14 at a suitable value such as 37° F. This temperature insures sufficient operation of the refrigerating system to maintain temperatures in the freezing compartment below about 8° F.

A door operated switch 68 is arranged in parallel with the thermostatically operated switch 64 so that the lamp 63 may be used for lighting the food storage compartment whenever the food storage compartment door is opened in accordance with well known practice.

By virtue of the relative sizes of the compartments 12 and 14 as well as the construction and arrangement of the insulation and the evaporators used for cooling the respective compartments it is possible to connect the two main evaporators in series without providing any restriction or control valve between the two sections. Since the specific heat of the plate type evaporator section 28 is much lower than the specific heat of the section 26, and quickly empties its liquid refrigerant into the section 26 when the compressor stops, it is apparent that the relatively high temperature air surrounding the section 28 will cause it to defrost itself long before there is any appreciable warm up of the frozen foods stored in the well insulated frozen food compartment 12. The heat applied to the plate type evaporator section 28 by the secondary condenser 52 also hastens the time required to defrost the section 28 and of course the lamp 63 further helps the defrosting operations when it turns on, but neither the lamp 63 nor the secondary condenser 52 heat the frozen food compartment 12 or its evaporator 26. By placing the evaporator section 28 in the upper portion of the food compartment 14 it is in contact with the warmest air in the compartment whereby the defrosting operation is further facilitated.

In accordance with the provisions of Rule 78a, reference is made to the following prior filed applications: Serial Number 183,963 filed November 3, 1950; Serial Number 223,550 filed April 28, 1951; Serial Number 236,645 filed July 13, 1951; Serial Number 243,782 filed August 27, 1951; and Serial Number 264,903 filed January 4, 1952.

While the form of embodiment of the invention as herein disclosed constitutes a preferred form, it is to be understood that other forms might be adopted, as may come within the scope of the claims which follow.

What is claimed is as follows:

1. A household refrigerator including a cabinet having separated food compartments a first one of which is for storing foods in a frozen state and a second of which is for storing foods in an unfrozen state, refrigerating means for cooling said compartments, door means for said compartments, said refrigerating means comprising a first evaporator section arranged in thermal exchange relationship with the walls of the first of said compartments and a second evaporator section arranged in thermal exchange relationship with the air within the second of said compartments, refrigerant liquefying means, refrigerant flow connections for supplying liquid refrigerant from said refrigerant liquefying means to said first evaporator section and said second evaporator section in series flow relationship, a secondary refrigerating system having a condenser portion arranged in thermal exchange relationship with said second evaporator section and having an evaporator portion arranged in thermal exchange relationship with at least one wall of said food compartment, and means for supplying heat to the air in said second compartment so as to artificially load said second evaporator.

2. A household refrigerator including a cabinet having a first compartment for preserving frozen foods and a second compartment for storing unfrozen foods, refrigerating means for cooling said first compartment below freezing temperature and for cooling said second compartment to a relatively higher temperature, said refrigerating means comprising a first evaporator section arranged in thermal exchange relationship with the walls of said first compartment and a second evaporator section arranged in thermal exchange relationship with the air within said second compartment, refrigerant liquefying means, refrigerant flow connections for supplying liquid refrigerant from said refrigerant liquefying means to said first named evaporator section and said second named evaporator section in series flow relationship, a secondary refrigerating system having a condenser arranged in thermal exchange relationship with said second evaporator section and having an evaporator portion arranged in thermal exchange relationship with at least one wall of said second compartment, means for supplying heat to the air in said second compartment, and means responsive to the temperature of said second evaporator section for starting and stopping the operation of said refrigerant liquefying means.

3. A household refrigerator including a cabinet having thermally insulated walls, a partition for dividing the interior of said cabinet into two compartments, refrigerating means for cooling said compartments, said refrigerating means comprising a first evaporator section arranged in thermal exchange relationship with the walls of a first one of said compartments for cooling said compartment to below freezing temperature and a second evaporator section arranged in thermal exchange relationship with the air within a second one of said compartments for cooling the same to above freezing temperature, refrigerant liquefying means, refrigerant flow connections for supplying liquid refrigerant from said refrigerant liquefying means to said first named evaporator section and said second named evaporator section in series flow relationship, a secondary refrigerating system having a condenser arranged in thermal exchange relationship with said second evaporator section and having an evaporator portion arranged in thermal exchange relationship with at least one wall of said second compartment, means for supplying heat to the air in said second compartment, and means responsive to the temperature of said second evaporator section for starting and stopping the operation of said refrigerant liquefying means, said last named means serving to stop the operation of said refrigerant liquefying means at a temperature below freezing and to initiate operation of the refrigerant liquefying means at a temperature high enough to allow defrosting of said second evaporator section before initiating operation to the refrigerant liquefying means.

4. A household refrigerator including a cabinet having thermally insulated walls, a partition for dividing the interior of said cabinet into two compartments, refrigerating means for cooling said compartments, said refrigerating means comprising a first evaporator section arranged in thermal exchange relationship with the walls of a first one of said compartments for cooling said compartment to below freezing temperature and a second evaporator section arranged in thermal exchange relationship with the air within a second one of said compartments for cooling the same to above freezing temperature, refrigerant liquefying means, refrigerant flow connections for supplying liquid refrigerant from said refrigerant liquefying means to said first named evaporator section and said second named evaporator section in series flow relationship, a secondary refrigerating system having a condenser arranged in thermal exchange relationship with said second evaporator section and having an evaporator portion arranged in thermal exchange relationship with at least one wall of said second compartment, a hydrator receptacle arranged in thermal exchange relationship with said one wall, and means for supplying heat to the air in said food compartment.

5. A household refrigerator including a cabinet having a first compartment for preserving frozen foods, a second compartment for preserving food in the unfrozen condition and a third compartment for housing a motor compressor unit, a refrigerating system including a first evaporator section in thermal exchange relationship with the walls of said first compartment, a second evaporator section in thermal exchange relationship with air in said second compartment, a condenser, a motor and a compressor disposed within said third compartment, refrigerant flow connections between said condenser, evaporator sections, and said compressor whereby refrigerant circulates through the same in series flow relationship, said connections including a capillary tube type of restrictor for supplying liquid refrigerant from said condenser to a first of said evaporator sections, means for dissipating a portion of the heat contained in the refrigerant flowing through said capillary tube restrictor into said second named compartment, a secondary refrigerating system having a condenser portion arranged in thermal exchange relationship with said second evaporator section and having an evaporator portion arranged between said second and third compartments so as to absorb heat passing from said third compartment towards said second compartment and for transferring said heat directly to said second evaporator section.

6. A household refrigerator including a cabinet having a first compartment for preserving frozen foods, a second compartment for preserving food in the unfrozen condition and a third compartment for housing a motor compressor unit, a refrigerating system including a first evaporator section in thermal exchange relationship with said first compartment, a second evaporator section in thermal exchange relationship with air in said second compartment, a condenser, a motor, and a compressor disposed within said third compartment, refrigerant flow connections between said condenser, evaporator sections, and said compressor whereby refrigerant circulates through the same in series flow relationship, said connections including a tube for supplying liquid refrigerant from said condenser to said evaporator sections, means for dissipating a portion of the heat contained in the refrigerant flowing through said tube into said second named compartment, a secondary refrigerating system having a condenser portion arranged in thermal exchange relationship with said second evaporator section and having an evaporator portion arranged between said second and third compartments so as to absorb heat passing from said third compartment towards said second compartment and for transferring said heat directly to said second evaporator section, heating means for said second compartment, and control means for intermittently initiating operation of said heating means only at low environment temperatures.

7. A household refrigerator including a cabinet having a first compartment for preserving frozen foods, a second compartment for preserving food in the unfrozen condition and a third compartment for housing a motor compressor unit, a refrigerating system including a first evaporator section in thermal exchange relationship with said first compartment, a second evaporator section in thermal exchange relationship with air in said second compartment, a condenser, a motor, and a compressor disposed within said third compartment, refrigerant flow connections between said condenser, evaporator sections, and said compressor whereby refrigerant circulates through the same in series flow relationship, said connections including a tube for supplying liquid refrigerant from said condenser to said evaporator sections, means for dissipating a portion of the heat contained in the refrigerant flowing through said tube into said second named compartment, a secondary refrigerating system having a condenser portion arranged in thermal exchange relationship with said second evaporator section and having an evaporator portion arranged between said second and third compartments so as to absorb heat passing from said third compartment towards said second compartment and for transferring said heat directly to said second evaporator section, heating means for said second compartment, and control means for intermittently initiating operation of said heating means only at low environment temperatures, said control means including means for providing increased cycles of operation of said heating means as the environment temperature falls.

8. A refrigerating apparatus including a cabinet having a first compartment for storing frozen foods, a second compartment for storing and preserving unfrozen foods, and a third compartment for housing refrigerant liquefying means, a first evaporator section arranged in thermal exchange relationship with the walls of said first compartment, a second evaporator section comprising an upright plate type evaporator, said plate type evaporator having a series type refrigerant passage formed therein with a liquid trapping accumulator chamber at an intermediate portion of said passage, refrigerant liquefying means for first supplying liquid refrigerant to said first named evaporator section and thereafter to said second named evaporator section, thermostatic control means responsive to the temperature of said plate type evaporator for starting and stopping the operation of said refrigerant liquefying means, electric heating means for adding heat to the air surrounding said second evaporator, and temperature responsive means for controlling said heating means.

9. A refrigerating apparatus including a cabinet having a first compartment for storing frozen foods, a second compartment for storing and preserving unfrozen foods, and a third compartment for housing refrigerant liquefying means, a first evaporator section arranged in thermal exchange relationship with the walls of said first compartment, a second evaporator section comprising an upright plate type evaporator provided with a series type refrigerant passage with a liquid trapping accumulator chamber at an intermediate portion of said passage, refrigerant liquefying means in said third compartment for first applying liquid refrigerant to said first named evaporator section and thereafter said second named evaporator section, and thermostatic control means responsive to the temperature of said plate type evaporator for starting and stopping the operation of said refrigerant liquefying means, first means for supplying heat to said plate type evaporator substantially continuously when refrigeration is required in said second compartment, and second means for supplying heat to the air surrounding said plate type evaporator under a predetermined condition when refrigeration is required in said first named compartment but not in said second named compartment whereby said second named evaporator is artificially heated to a temperature high enough to induce operation of said refrigerant liquefying means.

10. A refrigerating apparatus including a cabinet having a first compartment for storing frozen foods, a second compartment for storing and preserving unfrozen foods, and a third compartment for housing refrigerant liquefying means, a first evaporator section arranged in thermal exchange relationship with the walls of said first compartment, a second evaporator section comprising an upright plate type evaporator provided with a series type refrigerant passage with a liquid trapping accumulator chamber at an intermediate portion of said passage, refrigerant liquefying means in said third compartment for first applying liquid refrigerant to said first named evaporator section and thereafter said second named evaporator section, and thermostatic control means responsive to the temperature of said plate type evaporator for starting and stopping the operation of said refrigerant liquefying means, first means for supplying heat to said plate type evaporator substantially continuously when refrigeration is required in said second compartment, and second means for electrically heating said plate type evaporator so as to build up pressure in said accumulator chamber so as to force a portion of the liquid refrigerant in said plate type evaporator to return to said first evaporator section.

JAMES W. JACOBS.
CLIFFORD H. WURTZ.
JOHN H. HEIDORN.

References Cited in the file of this patent

UNITED STATES PATENTS

| Number | Name | Date |
|---|---|---|
| 2,159,592 | Kalischer | May 23, 1939 |
| 2,163,744 | Buchanan | June 27, 1939 |
| 2,167,442 | Alsing | July 25, 1939 |
| 2,246,956 | Shaw | June 24, 1941 |
| 2,289,728 | Rees | July 14, 1942 |
| 2,292,405 | Reeves | Aug. 11, 1942 |
| 2,400,135 | Quinn | May 14, 1946 |
| 2,433,188 | Kalischer | Dec. 23, 1947 |
| 2,455,850 | Atchison | Dec. 7, 1948 |
| 2,488,161 | Benson | Nov. 15, 1949 |
| 2,500,778 | Tobey | Mar. 14, 1950 |
| 2,586,853 | Morton | Feb. 26, 1952 |
| 2,644,314 | Schumacher | July 7, 1953 |